United States Patent
Zhu et al.

(10) Patent No.: US 10,417,280 B2
(45) Date of Patent: Sep. 17, 2019

(54) ASSIGNING GLOBAL EDGE IDS FOR EVOLVING GRAPHS

(71) Applicant: Intel Corporation, Santa Clara, CA (US)

(72) Inventors: Xia Zhu, Beaverton, OR (US); Theodore L. Willke, Tacoma, WA (US); Bryn Keller, Vancouver, WA (US); Shih-Chi Chen, Portland, OR (US); Kushal Datta, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 14/581,112

(22) Filed: Dec. 23, 2014

(65) Prior Publication Data

US 2016/0179980 A1    Jun. 23, 2016

(51) Int. Cl.
*G06F 17/30* (2006.01)
*G06F 16/901* (2019.01)

(52) U.S. Cl.
CPC ................ *G06F 16/9024* (2019.01)

(58) Field of Classification Search
CPC .................................................. G06F 17/30958
See application file for complete search history.

(56) References Cited

U.S. PATENT DOCUMENTS

| | | | |
|---|---|---|---|
| 2003/0120642 A1* | 6/2003 | Egilsson | G06F 17/3061 |
| 2010/0205126 A1 | 8/2010 | Anderson et al. | |
| 2013/0024412 A1* | 1/2013 | Gong | G06N 5/00 706/46 |

(Continued)

FOREIGN PATENT DOCUMENTS

EP    2743845 A1    6/2014

OTHER PUBLICATIONS

Bahmani et al. PageRank on an Evolving Graph. KDD'12, Aug. 12-16, 2012, Beijing, China. Copyright 2012 ACM 978-1-4503-1462-6 /12/08, [retrieved on Mar. 2, 2017]. Retrieved from the Interned <URL:http://wan.poly.edu/KDD2012/docs/p24.pdf>.*

(Continued)

*Primary Examiner* — Apu M Mofiz
*Assistant Examiner* — Husam Turki Samara
(74) *Attorney, Agent, or Firm* — International IP Law Group, P.L.L.C.

(57) ABSTRACT

A method, computing system, and computer-readable medium for assigning global edge IDs for evolving graphs are described herein. The method includes selecting a block size for an evolving graph and, as new vertices are added to the evolving graph, calculating block IDs for the evolving graph. Calculating the block IDs includes creating a table representing the evolving graph and, as new vertices are added to the evolving graph, calculating block IDs for cells in a new column of the table before calculating block IDs for cells in a new row of the table. The method also includes calculating global edge IDs for the evolving graph based on the source vertex ID, the target vertex ID, and the block ID for the block at which each edge is located. The method may also include calculating incremental Page Rank for the evolving graph.

25 Claims, 13 Drawing Sheets

(56) References Cited

U.S. PATENT DOCUMENTS

2015/0006316 A1* 1/2015 Zhou .................. G06Q 10/04
705/26.7

OTHER PUBLICATIONS

Desikan et al. Incremental Page Rank Computation on Evolving Graphs. WWW 2005, May 10-14, 2005, Chiba, Japan, [retrieved Mar. 2, 2017]. Retrieved from the Internet <URL: http://www-users.cs.umn.edu/~desikan/publications/WWW2005.pdf>.*

Jung et al. Recurrent Markov Cluster Algorithm for the Refinement of the Semantic Network. Tokyo Institute of Technology O-okayama, Meguro-ku, 152-8552, Tokyo, Japan, [retrieved on Mar. 2, 2017]. Retrieved from the Internet<URL:http://www.cs.brandeis.edu/~marc/misc/proceedings/lrec-2006/pdf/249_pdf.pdf>.*

Chapanond et al., "Evolving Graph Representation and Visualization," arXiv preprint arXiv:1006.4608, 50 pages, 2010 (http://arxiv.org/abs/1006.4608).

Fard et al., "Towards Efficient Query Processing on Massive Time-Evolving Graphs," In: 8th International Conference on Collaborative Computing: Networking, Applications and Worksharing (CollaborateCom), pp. 567-574, Oct. 14-17, 2012.

International Search Report, PCT No. PCT/US2015/055141, dated Jan. 26, 2016, 4 pages.

Jain et al., "GraphBuilder: Scalable Graph ETL Framework," Proceeding of First International Workshop on Graph Data Management Experiences and Systems (GRADES '13), Article No. 4, Jun. 23, 2013, 6 pages.

Kang et al., "GBASE: A Scalable and General Graph Management System," In: Proceedings of the 17th ACM SIGKDD International Conference on Knowledge Discovery and Data Mining (KDD '11), pp. 1091-1099, Aug. 21, 2011.

Supplementary European Search Report for European Patent Application No. EP 15873884, with a completion date of Apr. 17, 2018 and dated Apr. 30, 2018, 3 pages.

\* cited by examiner

100

300

400

500

600

600

700

800

Incremental_PageRank (Implementation Method 1)

```
// Initialize vertex value
  base graph :
    (0.0, 0.0)
  udpated graph :
    old vertices :
    (lastWindowPR, lastWindowDelta)
    new vertices :
    (alpha, alpha)
```

```
// Initial Edge Weight
  edge .attr = 1.0/ edge . src.outDegree
```

```
// First Message
initialMessage:
  base graph :
     msg = alpha/(1.0-alpha)
  updated graph :
     None
```

```
// broadcast to neighbors
SendMessage:
  if an edge is new and its srcId is old :
     Iterator((edge .dstId, (edge.srcAttr_1 - alpha) * edge.attr))
  newSrc->newDst or (edge.srcAttr ._2 > tol) :
     Iterator ( (edge.dstId , edge.SrcAttr_2 * edge.attr))
```

```
// Aggregate Messages for each Vertex
  messageCombiner(a,b):
     sum = a+b
```

```
// Update Vertex
  vertexProgram(sum) :
  updates = (1.0 - alpha) * sum
  (oldPR + updates, updates)
```

Incremental_PageRank (Implementation Method 2)

```
// Initialize vertex value
  base graph :
      (0.0, 0.0)
  updated graph:
      old vertices :
      (lastWindowPR, lastWindowDelta)
      new vertices :
      (alpha, alpha)
```

```
// Initial Edge Weight
  edge.attr = 1.0/edge.src.outDegree
```

```
// First Message
initialMessage:
    None
```

```
// broadcast to neighbors
SendMessage:
  if an edge is new and its srcId is old:
      Iterator((edge.dstId, (edge.srcAttr_1 - alpha) * edge.attr))
  newSrc->newDst or (edge.srcAttr._2 > tol) :
      Iterator((edge. dstId,edge.srcAttr_2 * edge.attr))
```

```
// Aggregate Messages for each Vertex
    messageCombiner(a, b):
      sum = a+b
```

```
// Update Vertex
    vertexProgram(sum) :
    updates = (1.0 - alpha) * sum
  (oldPR + updates, updates)
```

ASSIGNING GLOBAL EDGE IDS FOR EVOLVING GRAPHS

TECHNICAL FIELD

The present techniques relate generally to the management of evolving graphs for graph processing platforms. More specifically, the present techniques relate to assigning global edge IDs for evolving graphs.

BACKGROUND

In the "Big Data" era, many applications, such as those relating to e-commerce, social networking, and online services, for example, utilize huge graphs that grow quickly. In many cases, such applications must process millions to billions of new events each day. For example, on average, 560 million tweets are generated per day on Twitter, and 4.5 billion "likes" are generated per day on Facebook. As another example, Amazon sold 28.2 million items per day during the 2013 Christmas season. New events generate new relationships, such as user to product relationships, friend relationships, and user to ads relationships. Applications use the relationship data underlying these new relationships for a variety of purposes. For example, such relationship data may be used to make smart business decisions or provide fast and accurate recommendations to users.

In order for applications to be able to use such relationship data, the data are processed to create large graphs using graph analytics. Such graphs consist of large numbers of vertices and edges. The vertices are nodes representing, for example, different users, while the edges are lines representing the relationship data that connect different users to each other. In the Big Data era, these graphs grow very quickly as the amount of data increases. However, current techniques for processing these types of graphs generally relate to static graphs with a fixed number of vertices and edges. Current techniques do not provide an efficient way to update such graphs as new vertices and edges are added to the graphs over time.

BRIEF DESCRIPTION OF THE DRAWINGS

FIG. 9 is a screen shot of pseudo code representing one embodiment of the techniques described herein for calculating incremental Page Rank for evolving graphs;

FIG. 10 is a screen shot of pseudo code representing another embodiment of the techniques described herein for calculating incremental Page Rank for evolving graphs;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
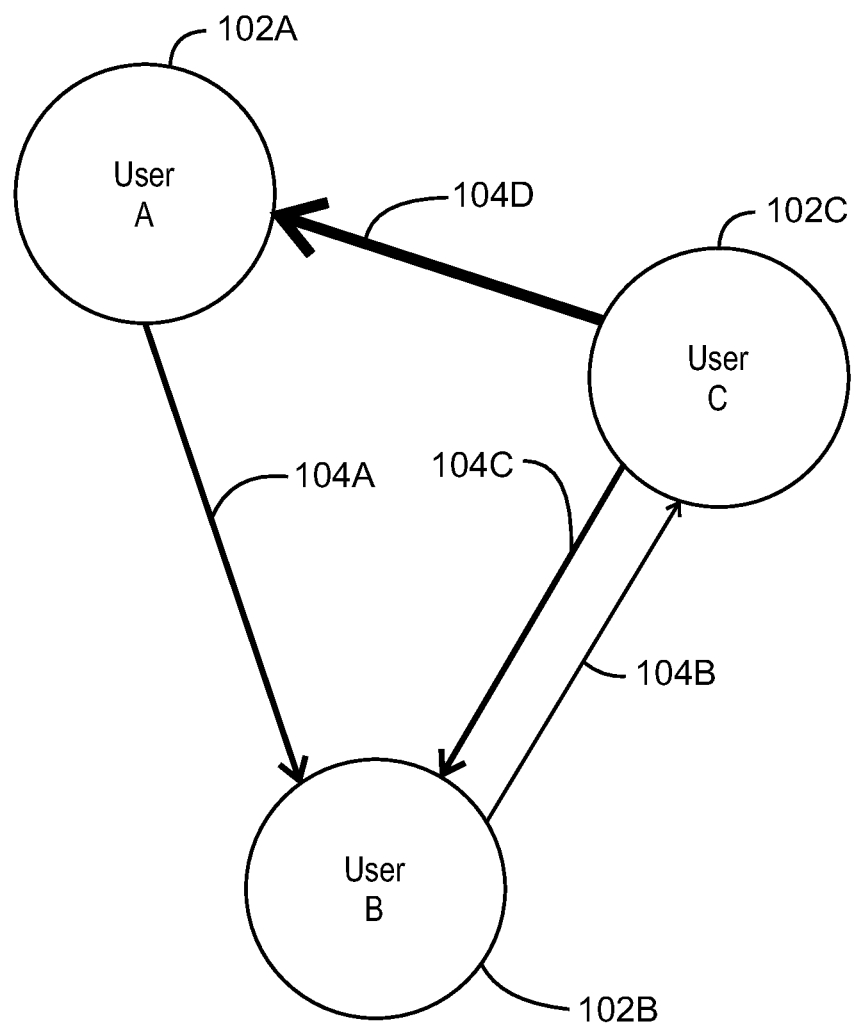
FIG. 1 is a schematic according to one embodiment showing a graph for processing relationship data.

As discussed above, large graphs are often used to represent relationship data as of a number of interconnected vertices and edges. However, current techniques for processing these types of graphs do not provide an efficient way to update the graphs as they evolve over time. More specifically, when processing relationship data, graph analytics often work on data in (sourceId, targetId, edgeValue) format, where "sourceId" is the source vertex ID, "targetId" is the target vertex ID, and "edgeValue" is the value of the edge. A global edge ID, which is defined as a function of sourceId and targetId, is important for both efficient edge value storage and fast calculations on edges, such as, for example, joins on two graphs with overlapped vertices. In the case of a static graph, the upper bound of both sourceId and targetId is the number of vertices in the graph. A global edge ID can be easily assigned as sourceId×numVertices+targetId. However, when the graph is evolving, the eventual number of vertices is unknown at each processing window. Therefore, the final number of vertices cannot be used to get a global edge ID. Accordingly, embodiments described herein provide a method for assigning a global edge ID as a function of sourceId and targetId for evolving graphs.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a schematic according to one embodiment showing a graph 100 for processing relationship data. As shown in FIG. 1, the graph 100 includes a number of vertices 102A-102C and a number of edges 104A-D. The vertices 102A-102C represent particular entities, such as, for example, user A, user B, and user C, respectively, in a social network. The edges 104A-D, which are shown as lines in FIG. 1, represent the strength and direction of the relationships between the vertices 102A-C. In other words, the edges 104A-D are the visual representation of the actual relationship data corresponding to the vertices 102A-C. In addition, the arrow on each edge 104A-D provides information regarding the direction of the relationship between the two vertices, thus differentiating the source vertex from the target vertex.

According to the example shown in FIG. 1, edge 104A connects vertex 102A to vertex 102B and may represent electronic communications, such as, for example, emails, instant messages, or another form of electronic communication, sent from user A to user B. Edge 104B connects vertex 102B to vertex 102C and may represent electronic communications sent from user B to user C. Edge 104C also connects vertex 102B to vertex 102C and may represent electronic communications sent from user C to user B. Edge 104D connects vertex 102C to vertex 102A and may represent electronic communications sent from user C to user A.

Furthermore, the thickness of the line representing each edge 104A, 104B, 104C, or 104D may vary depending on the strength of the relationship between the two vertices 102A, 102B, or 102C. According to the example shown in FIG. 1, edge 104D is thick, indicating that a large number of electronic communications were sent from user C to user A. In contrast, edge 104B is thin, indicating that a small number of electronic communications were sent from user B to user C.

According to embodiments described herein, the graph 100 shown in FIG. 1 may be extended to include thousands, millions, or even billions of vertices and edges as the amount of relationship data increases over time. Techniques described herein allow for the efficient use of identifiers for the edges of the graph 100 as the graph evolves.

Figure 2:
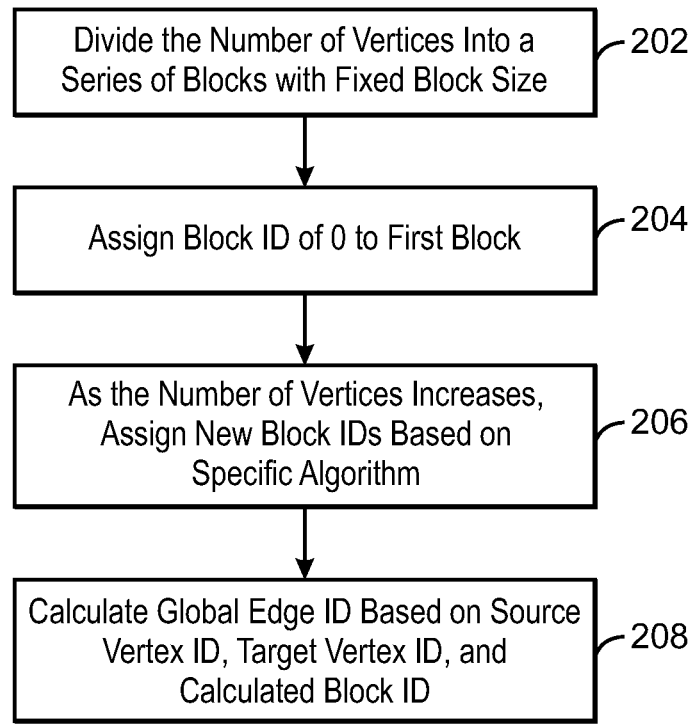
FIG. 2 is a process flow diagram according to one embodiment showing a method for calculating global edge IDs.

FIG. 2 is a process flow diagram according to one embodiment showing a method 200 for calculating global edge IDs. At block 202, the vertices within a graph may be divided into a series of blocks with fixed block size. Then, at block 204, a block ID of 0 may be assigned to the first block. As the graph grows, the number of buckets may be extended. More specifically, as the number of vertices increases, the specific algorithm described herein may be used to calculate new block IDs at block 206. The global edge ID may then be calculated at block 208 based on the source vertex ID, the target vertex ID, and the block ID for the block at which the edge is located.

According to this method, because global edge ID is a function of source vertex ID and target vertex ID, it is possible to maintain a much smaller mapping table. For example, the critical number of elements to cache may be only $$2 \times \frac{V}{B} - 1,$$

where V is the overall number of vertices and B is the block size, which is usually large.

The method 200 of FIG. 2 may also include selecting a block size. In some embodiments, $2^n$ may be used for the block size. This helps to convert multiplication to a shift operation in the CPU, and minimizes the computation overhead. However, it is to be understood that the block size is not limited to $2^n$ but, rather, any arbitrary number may be used for the block size.

Figure 3:
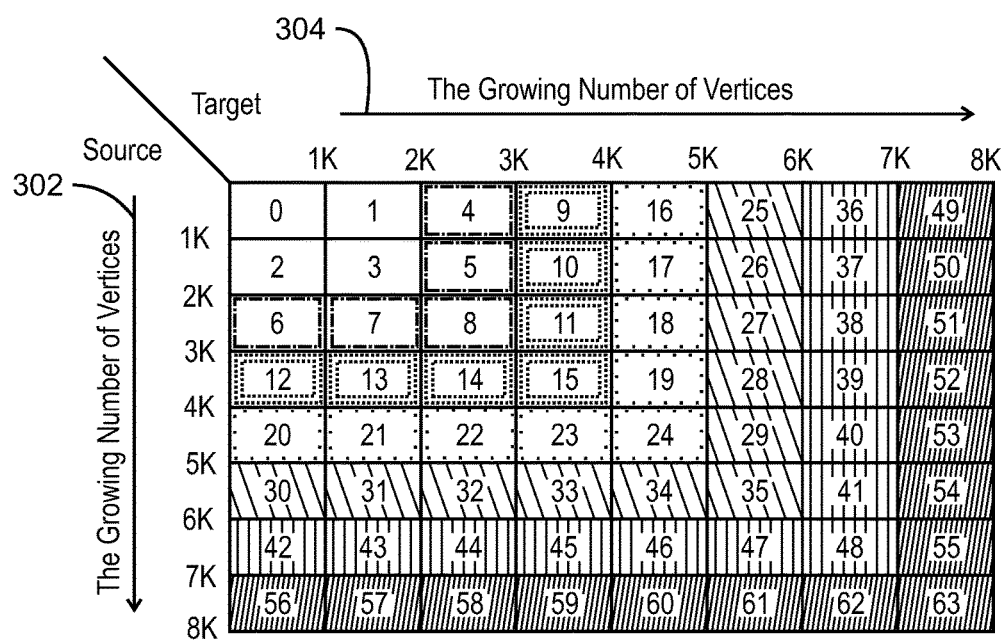
FIG. 3 is a table according to one embodiment illustrating a technique for assigning block IDs to increasing columns before assigning block IDs to increasing rows.

FIG. 3 is a table 300 according to one embodiment illustrating a technique for assigning block IDs to increasing columns before assigning block IDs to increasing rows. The y-axis 302 is the sourceId. Since the overall number of vertices keeps growing as time goes by, the sourceId also keeps growing. The x-axis 304 is the targetId. Similar to sourceId, the targetId also keeps growing as the overall number of vertices grows. According to the embodiment shown in FIG. 3, block IDs are assigned to increasing columns before assigning block IDs to increasing rows.

Figure 4:
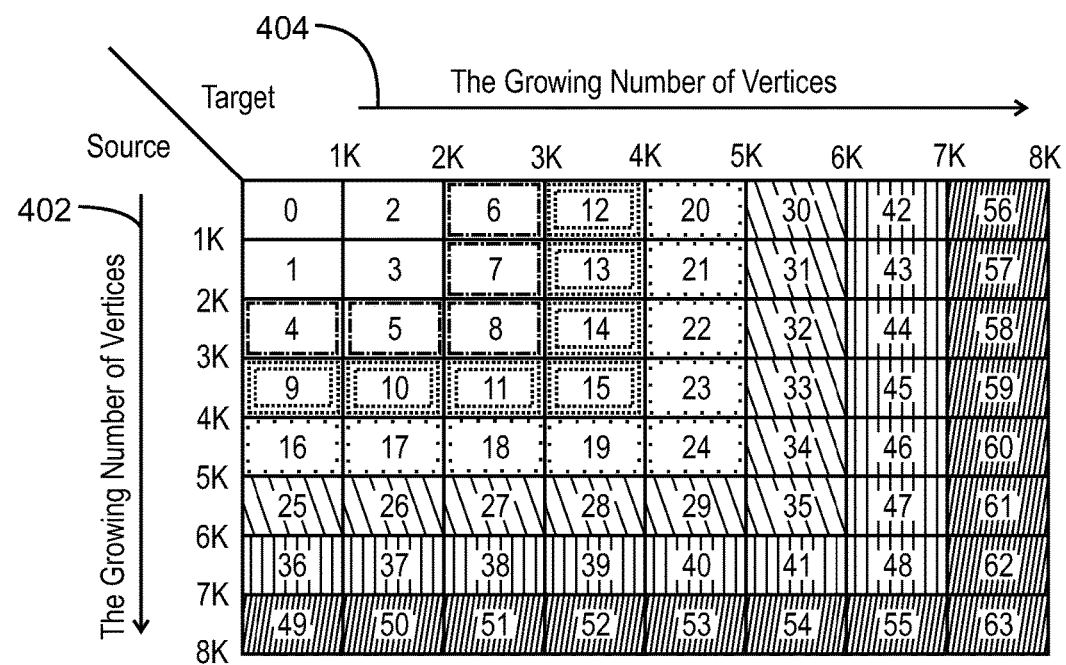
FIG. 4 is a table according to one embodiment illustrating a technique for assigning block IDs to increasing rows before assigning block IDs to increasing columns.

FIG. 4 is a table 400 according to one embodiment illustrating a technique for assigning block IDs to increasing rows before assigning block IDs to increasing columns. The y-axis 402 is the sourceId. Since the overall number of vertices keeps growing as time goes by, the sourceId also keeps growing. The x-axis 404 is the targetId. Similar to sourceId, the targetId also keeps growing as the overall number of vertices grows. According to the embodiment shown in FIG. 4, block IDs are assigned to increasing rows before assigning block IDs to increasing columns.

The block size used in FIGS. 3 and 4 is K. In some embodiments, the block size equals $2^n$, and n is configurable based on different usage cases. In the "Big Data" era, n could easily be 10, 20, or even larger, which means that the block size could be in the range of thousands (2,048), millions, (1,048,576), or even larger.

It is to be understood that the present techniques are described herein with reference to the embodiment shown in FIG. 3, i.e., assigning block IDs to increasing columns before increasing rows. However, the present techniques can be easily applied to the embodiment shown in FIG. 4 as well, i.e., assigning block IDs to increasing rows before increasing columns.

As graph size grows, the valid range of block IDs always grows from one square area to another larger square area, as shown by the shading in FIGS. 3 and 4. The graph starts from block ID 0, where the number of vertices is in the range of [0,K). As the number of vertices grows to be in the [K,2K) range, the valid block IDs are increased from set {0} to {0,1,2,3}. As the number of vertices grows to be in the [2K,3K) range, the valid block IDs are increased from set {0,1,2,3} to {0,1,2,3,4,5,6,7,8}. The same trend continues as the size of the graph increases.

There are many ways to calculate block IDs based on the designed assignment shown in FIG. 3. For example, in some embodiments, block IDs can be calculated in a recursive function, as discussed in detail below with respect to FIG. 5.

Figure 5:
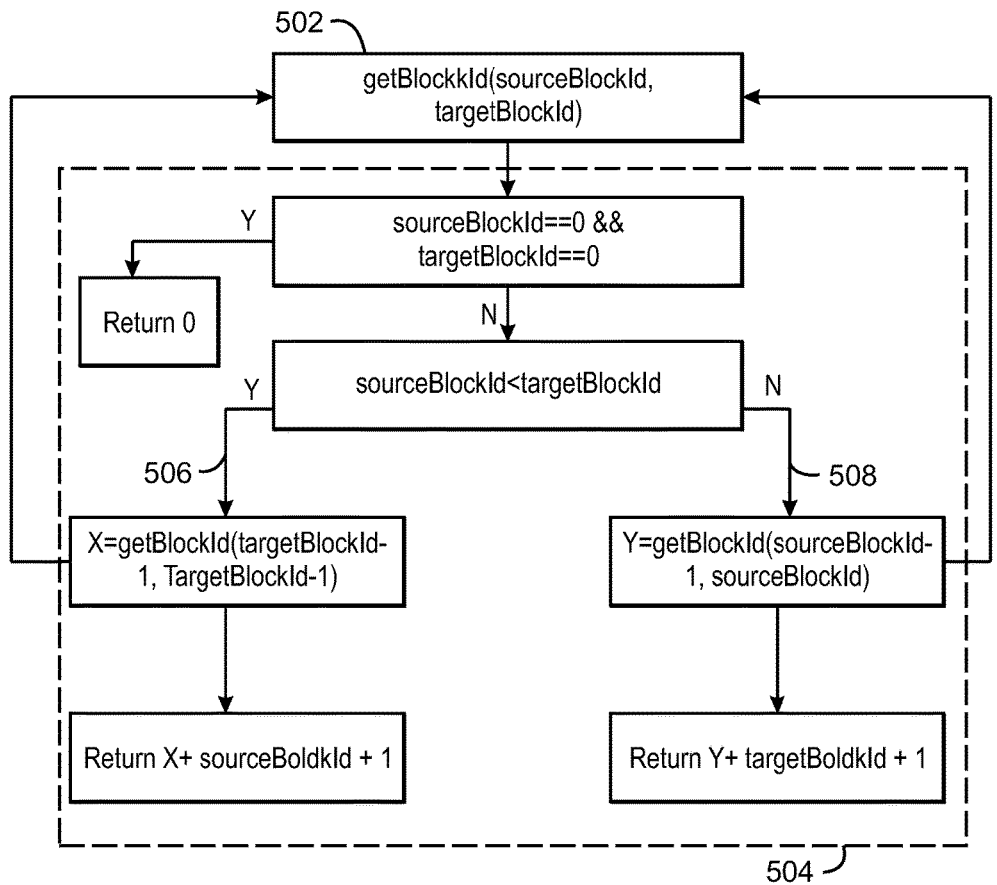
FIG. 5 is a process flow diagram according to one embodiment showing a method for calculating block IDs in a recursive function.

FIG. 5 is a process flow diagram according to one embodiment showing a method 500 for calculating block IDs in a recursive function. The method 500 includes two phases. The first phase is represented by block 502 and includes calculating the source block ID ("sourceBlockId") and the target block ID ("targetBlockId"). The sourceBlockId and the targetBlockId may be calculated according to Eqns. 1 and 2.

$$sourceBlockId = \left\lfloor \frac{sourceId}{blockSize} \right\rfloor \quad \text{Eqn. 1}$$

$$targetBlockId = \left\lfloor \frac{targetId}{blockSize} \right\rfloor \quad \text{Eqn. 2}$$

According to Eqns. 1 and 2, the result of sourceId divided by blockSize is rounded down to the nearest integer to derive the sourceBlockId. Similarly, the result of targetId divided by blockSize is rounded down to the nearest integer to derive the targetBlockId. It is to be understood that Eqns. 1 and 2 are exemplary of one embodiment of the techniques described herein. Eqns. 1 and 2 may be modified in any manner depending on the details of the specific embodiment of the techniques described herein.

The second phase of the method 500 is represented by the remaining blocks shown in FIG. 5, as indicated by dotted line 504, and includes assigning the block ID based on the sourceBlockId and the targetBlockId. For example, when both the sourceBlockId and the targetBlockId are 0, the resulting block ID ("BlockId") is 0. When the number of vertices grows from the [0,K) range to the [K,2K) range, the set of sourceBlockId and targetBlockId pairs will also grow from {(0,0)} to {(0,0), (0,1), (1,0), (1,1)}.

When sourceBlockId is 0 and targetBlockId is 1, the calculation goes with the "if" branch, represented by arrow 506 in FIG. 5. It recursively calls to getBlockId(0,0) and the resulting block ID for this case is 1. When sourceBlockId is 1 and targetBlockId is 0, the calculation goes with the "else" branch, represented by arrow 508 in FIG. 5. It recursively calls to getBlockId(0,1) and the resulting block ID for this case is 2. When the number of vertices grows from the [0,3K) range to the [3K,4K) range, eight block IDs are already assigned.

FIG. 5 is not intended to indicate that the blocks of the method 500 are to be executed in any particular order, or that the method 500 is to include all of the blocks shown in FIG. 5 in every case. Moreover, the method 500 is not limited to the blocks shown in FIG. 5. Rather, any number of additional blocks may be added to the method 500, depending on the details of the specific implementation.

Figure 6A:
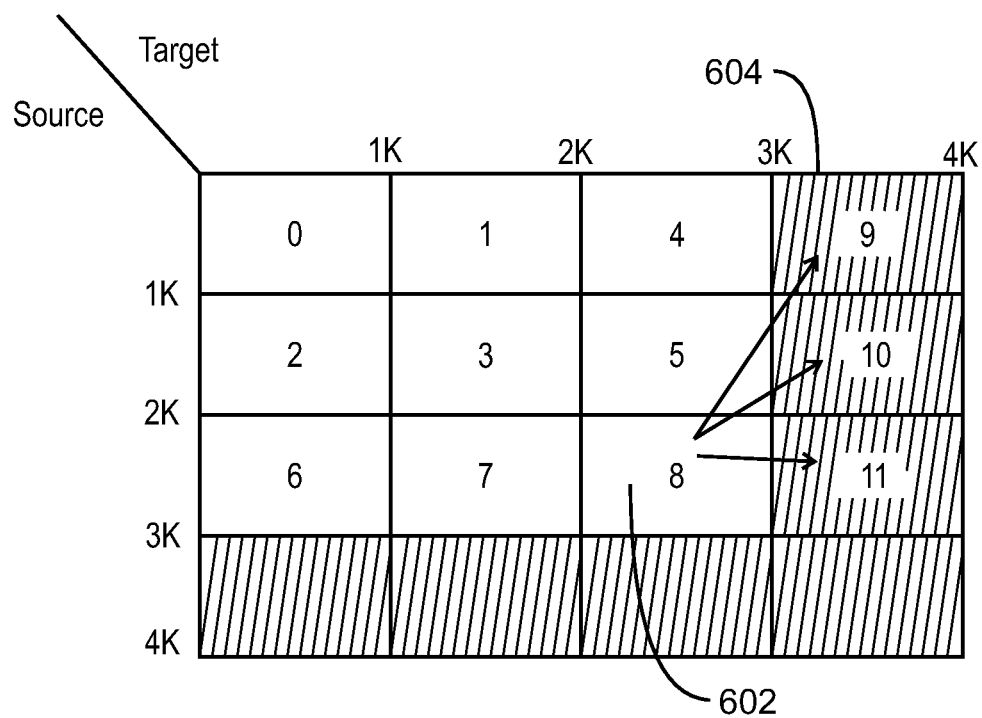
FIG. 6A is a table according to one embodiment illustrating a technique for assigning block IDs to cells in newly added columns based on the last diagonal cell and the source block IDs.

FIG. 6A is a table 600 according to one embodiment illustrating a technique for assigning block IDs to cells in newly added columns based on the last diagonal cell and the source block IDs. According to the embodiment shown in FIG. 6A, the last diagonal cell 602 has a sourceBlockId of 2, a targetBlockId of 2, and a previously assigned block ID of 8. The calculations for the cells in newly added column 604 are shown below.

blockId(0,3)=blockId(2,2)+0+1=9 blockId(1,3)=blockId(2,2)+1+1=10 blockId(2,3)=blockId(2,2)+2+1=11

Figure 6B:
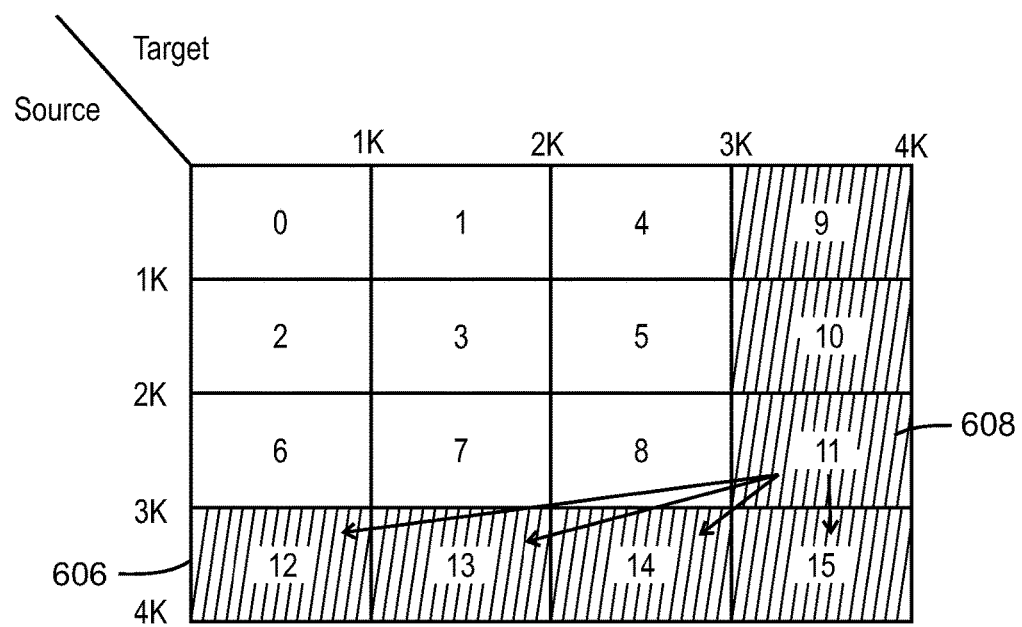
FIG. 6B is the table of FIG. 6 with a newly added row.

FIG. 6B is the table 600 of FIG. 6 with a newly added row 606. FIG. 6B illustrates the technique described herein for assigning block IDs for cells in newly added rows based on the cell to the right of the last diagonal cell and the targetBlockIds. According to the embodiment shown in FIG. 6B, the previous diagonal cell 608 has a sourceBlockId of 3, a targetBlockId of 2, and a block ID of 11. The calculations for the cells in the newly added row 606 are shown below.

blockId(3,0)=blockId(2,3)+0+1=12 blockId(3,1)=blockId(2,3)+1+1=13 blockId(3,2)=blockId(2,3)+2+1=14 blockId(3,3)=blockId(2,3)+3+1=15

In various embodiments, the same calculation mechanism may be used as the graph size continuously increases.

In other embodiments, calculated block IDs may be cached. Since graph size always increases, a block ID may be obtained by looking up previously calculated block IDs on an older graph size. If a previously calculated block ID is found, the previously calculated block ID may be used to calculate a new block ID, instead of recalculating the block ID from recursive function. This approach uses more memory than the previous approach, since the lookup table must be stored in memory. However, this approach may sometimes be preferable when the graph size is very large.

Figure 7:
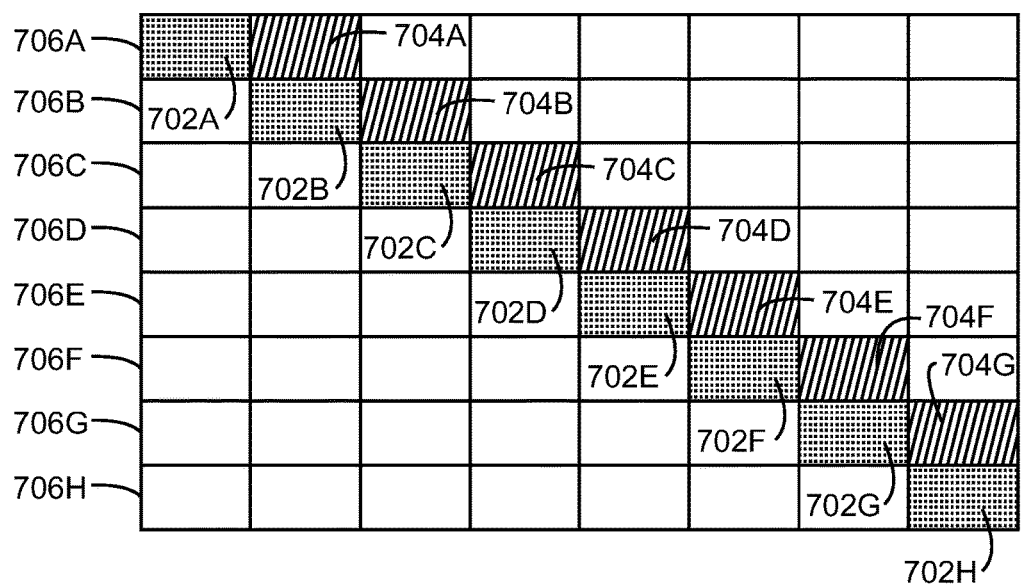
FIG. 7 is a table according to one embodiment showing critical block IDs to cache based on the calculation order described herein.

FIG. 7 is a table 700 according to one embodiment showing critical block IDs to cache based on the calculation order described herein. FIGS. 6A and 6B show that the most important block IDs for each calculation window are the diagonal cell and the cell next to the diagonal cell in each row. Therefore, for the embodiment shown in FIG. 7, the block IDs for the diagonal cells 702A-H and the block IDs for the cell 704A-G next to the diagonal cell 702A-H in each row 706A-H may be cached. Only caching the block IDs for these cells may save memory while still providing good performance.

In various embodiments, the next phase is to calculate global edge IDs ("globalIds") on evolving graphs. Based on the above algorithm for calculating block IDs on evolving graphs, the global edge IDs may be easily calculated. Specifically, according to embodiments described herein, the source offset ("sourceOffset"), target offset ("targetOffset"), sourceBlockId, and targetBlockId may be calculated. Next, the sourceBlockId and the targetBlockId may be used to calculate the BlockId. The sourceOffset, targetOffset, and BlockId may then be used to calculate the final globalId of an edge or (sourceId, targetId) pair. The following pseudo code may be used to calculate global edge IDs in this manner.

```
val source Offset = sourceId % blockSize
val targetOffset = targetId % blockSize
val sourceBlockId = sourceId / blockSize
val targetBlockId = targetId / blockSize
val BlockId = getBlockId(sourceBlockId.toLong, targetBlockId.toLong)
val globalId = BlockId *blockSize * blockSize + sourceOffset * blockSize +
    targetOffset
```

In addition to providing a method for assigning global edge IDs for evolving graphs, the present techniques are also directed to providing a method for calculating incremental Page Rank for evolving graphs, as discussed further herein. For analytics on evolving graphs, the naïve approach is to re-generate the whole graph at each processing window and re-run machine learning algorithms on top of newly generated graphs. According to this approach, the existing static algorithms do not have to be changed. However, this is not an efficient approach. A more sophisticated approach is to reuse trained results from the previous processing window and, after generating graphs with new information in a new processing window, run incremental machine learning on top of the previously trained results.

Page Rank is an algorithm that may be used to rank websites in search engine results. It is the de-facto "Hello Word" machine learning algorithm in the "Big Data" era. An example of a Page Rank algorithm is given by Eqn. 3.

$$PR(A) = \alpha + (1-\alpha) \times \sum_{i=1}^{N} \frac{PR(T_i)}{C(T_i)}$$ Eqn. 3

In Eq. 3, PR(A) is the PageRank of page A; $PR(T_i)$ is the PageRank of pages $T_i$ which link to page A; $C(T_i)$ is the number of outbound links on page $T_i$; and $\alpha$ is the reset probability, which can be set between 0 and 1. It is to be understood that Eqn. 3 is exemplary of one embodiment of the techniques described herein. Eqn. 3 may be modified in any manner depending on the details of the specific embodiment of the techniques described herein.

Current frameworks for implementing Page Rank are static and are not compatible with evolving graphs. This limits the usefulness of Page Rank in the "Big Data" era. Accordingly, embodiments described herein provide a method for calculating incremental Page Rank on evolving graphs for graph processing platforms.

Figure 8:
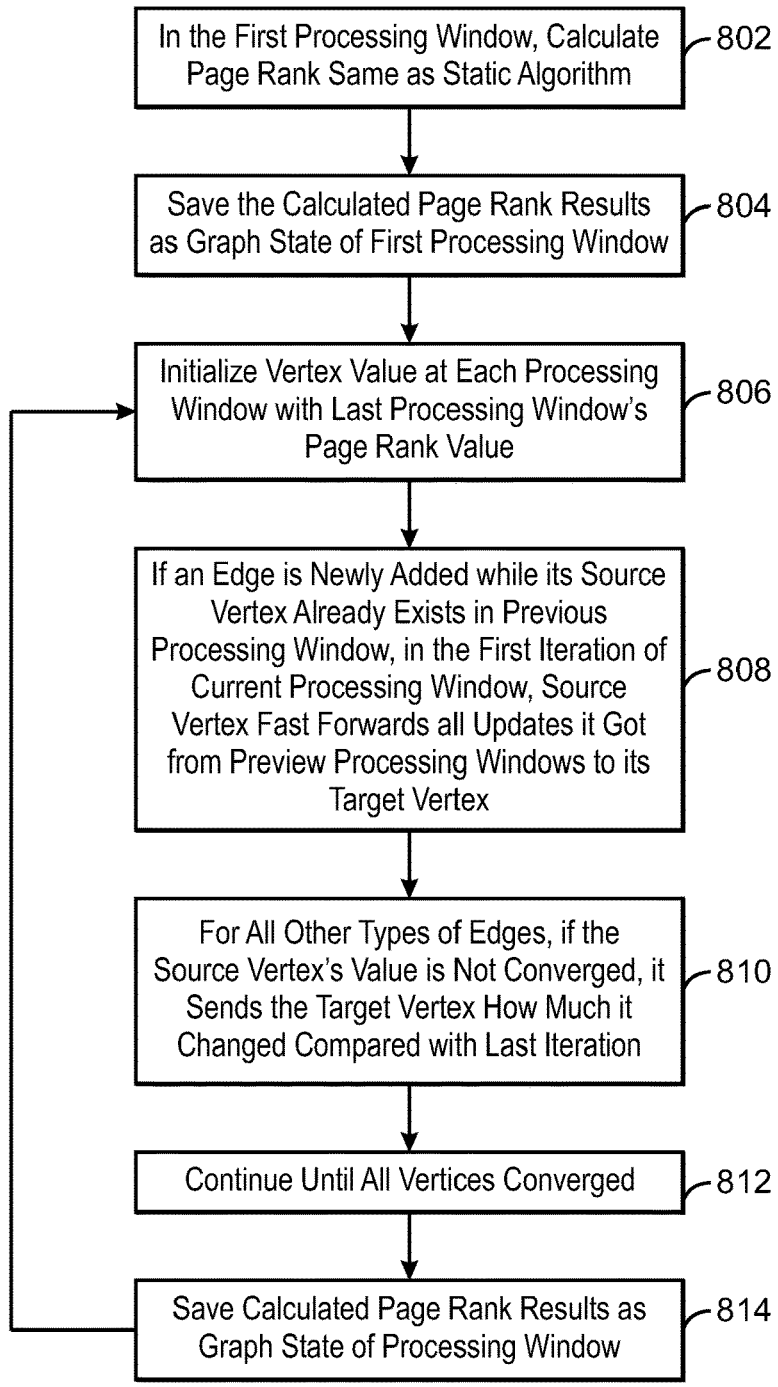
FIG. 8 is a process flow diagram according to one embodiment showing a method for calculating Page Rank incrementally for evolving graphs.

FIG. 8 is a process flow diagram according to one embodiment showing a method 800 for calculating Page Rank incrementally for evolving graphs. The basic idea is to distinguish between the base graph and the new graph at each processing window when initializing the vertex value and sending initial messages. Specifically, in the first iteration of a processing window, if an edge is newly added and its source vertex is old, the source vertex may fast forward all updates it got from all previous windows to the target vertex of the current edge.

The method 800 may begin at block 802, at which the Page Rank is calculated in the first processing window in the same manner as it would be calculated for the static algorithm. At block 804, the calculated Page Rank results are saved as the graph state of the first processing window.

The incremental Page Rank calculation then begins at block 806, at which the vertex value at each processing window is initialized with the last processing window's Page Rank value. In various embodiments, the vertex values may be initialized differently based on whether Page Rank is being calculated on the base graph or the updated graph. When Page Rank is being calculated on the base graph, every vertex may be initialized as (alpha, alpha). However, when Page Rank is being calculated on the updated graph, the old vertices may keep their trained values from the last processing window. Specifically, the value for old vertices may be (lastWindowPageRank, lastWindowDelta), while new vertices may be initialized as (alpha, alpha).

At block 808, if an edge is newly added while its source vertex already exists in the previous processing window, the source vertex may fast forward all updates it got from the previous processing windows to its target vertex in the first iteration of the current processing window. At block 810, for all other types of edges, if the source vertex's value is not converged, the source vertex may send the target vertex how much it changed compared with the last iteration. This may continue until all vertices are converged, as shown by block 812 in FIG. 8. Then, at block 814, the calculated Page Rank results may be saved as the graph state of the processing window.

FIG. 8 is not intended to indicate that the blocks of the method 800 are to be executed in any particular order, or that the method 800 is to include all of the blocks shown in FIG. 8 in every case. Moreover, the method 800 is not limited to the blocks shown in FIG. 8. Rather, any number of additional blocks may be added to the method 800, depending on the details of the specific implementation.

In some embodiments, just as in static Page Rank, the edge weight may be initialized as the reciprocal of the number of out edges from the source vertex of the edge. When the number of out edges of a vertex has changed in the updated graph, the weights of all its out edges will also be updated based on the new number of out edges of the vertex.

FIG. 9 is a screen shot 900 of pseudo code representing one embodiment of the techniques described herein for calculating incremental Page Rank for evolving graphs. In the embodiment shown in FIG. 9, the initial message on the base graph is different from the initial message on the updated graph. The initial message on the base graph is the same as the static Page Rank calculation. Specifically, the initial message is a constant value, alpha/(1−alpha). In contrast, for the updated graph, no initial message is needed.

When a vertex sends messages informing its neighbors of the vertex's new value in the current iteration, if it is from an old vertex to a new vertex, the old vertex may fast forward all updates it got from previous windows to the new vertex. Since the effective first value for each vertex is alpha, the old vertex may calculate the delta value between its Page Rank in the last processing window and alpha, and send this delta value to the new vertex. For the rest of the vertex combinations, the messages may only be sent when a vertex's delta value is higher than the convergence threshold. In FIG. 9, tol is used to represent the convergence threshold.

FIG. 10 is a screen shot 1000 of pseudo code representing another embodiment of the techniques described herein for calculating incremental Page Rank for evolving graphs. According to the embodiment shown in FIG. 10, similar to another implementation of static Page Rank, the initial constant message may be folded into the initial value of a vertex.

Figure 11:
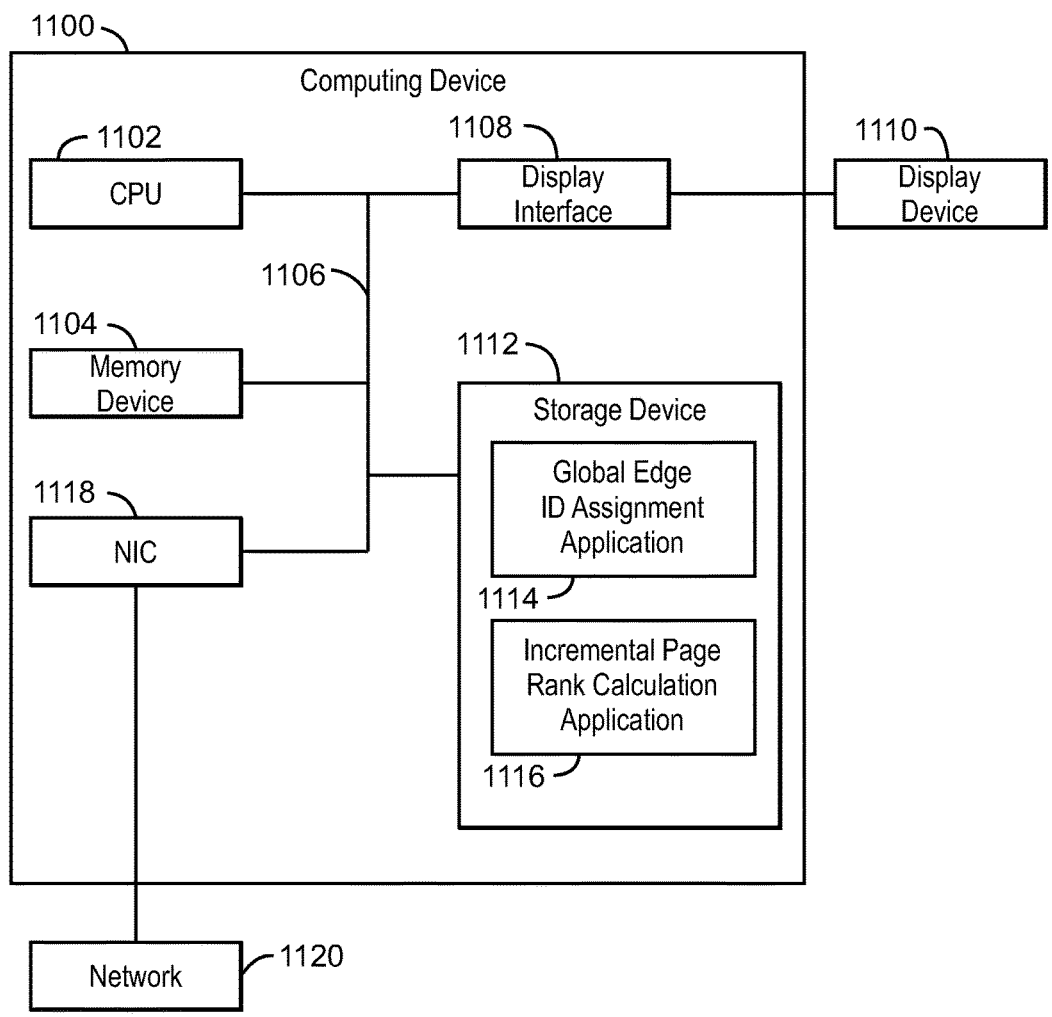
FIG. 11 is a block diagram illustrating a computing device configured to provide global edge ID assignment and/or incremental Page Rank calculation for evolving graphs according to embodiments described herein.

FIG. 11 is a block diagram illustrating a computing device 1100 configured to provide global edge ID assignment and/or incremental Page Rank calculation for evolving graphs according to embodiments described herein. The computing device 1100 may be, for example, a laptop computer, desktop computer, tablet computer, mobile device, or server, among others. The computing device 1100 may include a central processing unit (CPU) 1102 that is configured to execute stored instructions, as well as a memory device 1104 that stores instructions that are executable by the CPU 1102. The CPU may be coupled to the memory device 1104 by a bus 1106. Additionally, the CPU 1102 can be a single core processor, a multi-core processor, a computing cluster, or any number of other configurations. Furthermore, the computing device 1100 may include more than one CPU 1102. The memory device 1104 can include random access memory (RAM), read only memory (ROM), flash memory, or any other suitable memory systems. For example, the memory device 1104 may include dynamic random access memory (DRAM).

The CPU 1102 may also be linked through the bus 1106 to a display interface 1108 configured to connect the computing device 1100 to a display device 1110. The display device 1110 may include a display screen that is a built-in component of the computing device 1100. The display device 1110 may also include a computer monitor, television, or projector, among others, that is externally connected to the computing device 1100.

The computing device may also include a storage device 1112. The storage device 1112 may be a physical memory such as a hard drive, an optical drive, a thumbdrive, an array of drives, or any combinations thereof. The storage device 1112 may also include remote storage drives. In various embodiments, the storage device 1112 includes a global edge ID assignment application 1114 that is configured to run on the computing device 1100. The global edge ID assignment application 1114 may include instructions for assigning global edge IDs for edges of evolving graphs according to the embodiments described herein. In various embodiments, the storage device 1112 also includes an incremental Page Rank calculation application 1116 that is configured to run on the computing device 1100. The incremental Page Rank calculation application 1116 may include instructions for performing incremental Page Rank calculation for evolving graphs according to embodiments described herein. The storage device 1112 may further include any number of additional applications that are configured to run on the computing device to perform various tasks.

The computing device 1100 may also include a network interface controller (NIC) 1118 that is configured to connect the computing device 1100 through the bus 1106 to a network 1120. The network 1120 may be a wide area network (WAN), local area network (LAN), or the Internet, among others. According to embodiments described herein, the computing device 1100 may be configured to send information generated by the global edge ID assignment application 1114 and/or the incremental Page Rank calculation application 1116 to other devices and/or users via the network 1120.

The block diagram of FIG. 11 is not intended to indicate that the computing device 1100 is to include all of the components shown in FIG. 11. Further, the computing device 1100 may include any number of additional components not shown in FIG. 11, depending on the details of the specific implementation.

Figure 12:
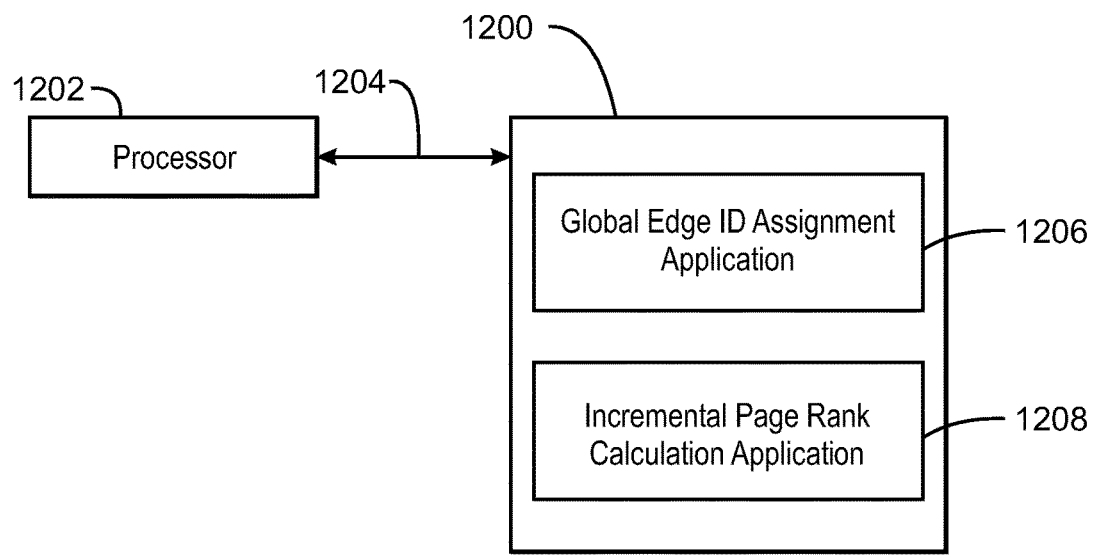
FIG. 12 is a block diagram illustrating a computer-readable medium configured to provide global edge ID assignment and/or incremental Page Rank calculation for evolving graphs according to embodiments described herein.

FIG. 12 is a block diagram illustrating a computer-readable medium 1200 configured to provide global edge ID assignment and/or incremental Page Rank calculation for evolving graphs according to embodiments described herein. The computer-readable medium 1200 may be accessed by a processor 1202 over a computer bus 1204. In some examples, the computer-readable medium 1200 may be a non-transitory computer-readable medium. In some examples, the computer-readable medium may be a storage medium, but not including carrier waves, signals, and the like. Furthermore, the computer-readable medium 1200 may include computer-executable instructions to direct the processor 1202 to perform the current method.

The various software components discussed herein may be stored on the computer-readable medium 1200, as indicated in FIG. 12. For example, a global edge ID assignment application 1206 may be configured to assign global edge IDs for the edges of graphs that evolve as the amount of relationship data to be processed increases. In addition, an incremental Page Rank calculation application 1208 may be configured to calculate incremental Page Rank for evolving graphs.

The block diagram of FIG. 12 is not intended to indicate that the computer-readable medium 1200 is to include all of the components shown in FIG. 12. Further, the computer-readable medium 1200 may include any number of additional components not shown in FIG. 12, depending on the details of the specific implementation.

Examples may include subject matter such as systems and methods that provide global edge ID assignment for evolving graphs. Examples may also include subject matter such as systems and methods that provide incremental Page Rank calculation for evolving graphs.

Example 1 includes a method for calculating global edge IDs for evolving graphs. The method includes selecting a block size for an evolving graph including a number of vertices and a number of edges, and calculating block IDs for the evolving graph. Calculating the block IDs includes creating a table representing the evolving graph, wherein the table includes cells of the selected block size, a y-axis representing source vertex ID, and an x-axis representing target vertex ID, and as new vertices are added to the evolving graph, calculating block IDs for cells in a new column of the table before calculating block IDs for cells in a new row of the table. The method also includes calculating global edge IDs for the evolving graph based on the source vertex ID, the target vertex ID, and the block ID for the block at which each edge is located.

Example 2 incorporates the subject matter of Example 1. In this example, the method includes calculating the block IDs in a recursive function.

Example 3 incorporates the subject matter of any combination of Examples 1-2. In this example, calculating the block IDs in the recursive function includes calculating the block ID for each cell in a new column of the table based on a source vertex ID of each cell and the calculated block ID for a last diagonal cell in the table.

Example 4 incorporates the subject matter of any combination of Examples 1-3. In this example, calculating the block IDs in the recursive function includes calculating the block ID for each cell in a new row of the table based on a target vertex ID of each cell and the calculated block ID for a cell to the right of a last diagonal cell in the table.

Example 5 incorporates the subject matter of any combination of Examples 1-4. In this example, the method includes caching block IDs for each diagonal cell and the cell to the right of each diagonal cell in the table.

Example 6 incorporates the subject matter of any combination of Examples 1-5. In this example, the method includes selecting the block size as $2^n$.

Example 7 incorporates the subject matter of any combination of Examples 1-6. In this example, the method includes calculating block IDs for cells in a new column of the table before calculating block IDs for cells in a new row of the table includes adding a new column as new vertices are added to the evolving graph, calculating block IDs for cells in the new column, adding a new row once block IDs have been calculated for the cells in the new column, and calculating block IDs for cells in the new row.

Example 8 incorporates the subject matter of any combination of Examples 1-7. In this example, the method includes repeating the method of example 7 as new vertices are continuously added to the evolving graph.

Example 9 incorporates the subject matter of any combination of Examples 1-8. In this example, the method includes calculating block IDs for cells in a new row of the table before calculating block IDs for cells in a new column of the table.

Example 10 incorporates the subject matter of any combination of Examples 1-9. In this example, calculating block IDs for block IDs for cells in a new row of the table before calculating block IDs for cells in a new column of the table includes adding a new row as new vertices are added to the evolving graph, calculating block IDs for cells in the new row, adding a new column once block IDs have been calculated for the cells in the new row, and calculating block IDs for cells in the new column.

Example 11 incorporates the subject matter of any combination of Examples 1-10. In this example, the method includes repeating the method of claim 10 as new vertices are continuously added to the evolving graph.

Example 12 incorporates the subject matter of any combination of Examples 1-11. In this example, the method includes calculating incremental Page Rank for the evolving graph by calculating a Page Rank value in a first processing window using a static algorithm, saving the calculated Page Rank value as a graph state of the first processing window, and initializing a vertex value at each processing window with a Page Rank value of a previous processing window. If a new edge is added while a source vertex value for the new edge already exists in a previous processing window, the method also includes fast forwarding all updates the source vertex received from the previous processing window to a target vertex in a first iteration of a current processing window. For all other types of edges, if a source vertex value for the edge does not exist, the method also includes calculating a change in the source vertex value between a current iteration and a previous iteration and sending the change in the source vertex value to a target vertex. The method further includes continuing this process until vertex values have been calculated for all vertices and saving the vertex values as incremental Page Rank values for the evolving graph.

Example 13 includes a machine readable medium including code that, when executed, causes a machine to perform the method of any combination of examples 1-12.

Example 14 includes a computing system for calculating global edge IDs for evolving graphs. The computing system includes a processor and a global edge ID assignment application, at least partially including hardware logic. The hardware logic of the global edge ID assignment application is to calculate block IDs for the evolving graph. Calculating the block IDs includes creating a table representing the evolving graph, wherein the table includes cells of a fixed block size, a y-axis representing source vertex ID, and an x-axis representing target vertex ID, and as new vertices are added to the evolving graph, calculating block IDs for cells in a new column of the table before calculating block IDs for cells in a new row of the table. The hardware logic of the global edge ID assignment application is also to calculate global edge IDs for the evolving graph based on the source vertex ID, the target vertex ID, and the block ID for the block at which each edge is located.

Example 15 incorporates the subject matter of Example 14. In this example, the hardware logic of the global edge ID assignment application is to calculate the block IDs in a recursive function by calculating the block ID for each cell in a new column of the table based on a source vertex ID of each cell and the calculated block ID for a last diagonal cell in the table, and calculating the block ID for each cell in a new row of the table based on a target vertex ID of each cell and the calculated block ID for a cell to the right of a last diagonal cell in the table.

Example 16 incorporates the subject matter of any combination of Examples 14-15. In this example, the hardware logic of the global edge ID assignment application is to cache block IDs for each diagonal cell and the cell to the right of each diagonal cell in the table.

Example 17 incorporates the subject matter of any combination of Examples 14-16. In this example, the hardware logic of the global edge ID assignment application is to calculate block IDs for cells in a new column of the table before calculating block IDs for cells in a new row of the table by adding a new column as new vertices are added to the evolving graph, calculating block IDs for cells in the new column, adding a new row once block IDs have been calculated for the cells in the new column, and calculating block IDs for cells in the new row.

Example 18 incorporates the subject matter of any combination of Examples 14-17. In this example, the hardware logic of the global edge ID assignment application is to repeat the method of example 17 as new vertices are added to the evolving graph.

Example 19 incorporates the subject matter of any combination of Examples 14-18. In this example, the hardware logic of the global edge ID assignment application is to calculate block IDs for cells in a new row of the table before calculating block IDs for cells in a new column of the table by adding a new row as new vertices are added to the evolving graph, calculating block IDs for cells in the new row, adding a new column once block IDs have been calculated for the cells in the new row, and calculating block IDs for cells in the new column.

Example 20 incorporates the subject matter of any combination of Examples 14-19. In this example, the computing system includes an incremental Page Rank calculation application, at least partially including hardware logic. The hardware logic of the incremental Page Rank calculation application is to calculate a Page Rank value in a first processing window using a static algorithm, save the calculated Page Rank value as a graph state of the first processing window, and initialize a vertex value at each processing window with a Page Rank value of a previous processing window. If a new edge is added while a source vertex value for the new edge already exists in a previous processing window, the hardware logic of the incremental Page Rank calculation application is to fast forward all updates the source vertex received from the previous processing window to a target vertex in a first iteration of a current processing window. For all other types of edges, if a source vertex value for the edge does not exist, the hardware logic of the incremental Page Rank calculation application is to calculate a change in the source vertex value between a current iteration and a previous iteration and send the change in the source vertex value to a target vertex. The hardware logic of the incremental Page Rank calculation application is also to continue this process until vertex values have been calculated for all vertices and save the vertex values as incremental Page Rank values for the evolving graph.

Example 21 includes a tangible, non-transitory, computer-readable medium including code to direct a processor to select a block size for an evolving graph including a number of vertices and a number of edges and calculate block IDs for the evolving graph. Calculating the block IDs includes creating a table representing the evolving graph, wherein the table includes cells of the selected block size, a y-axis representing source vertex ID, and an x-axis representing target vertex ID, and as new vertices are added to the evolving graph, calculating block IDs for cells in a new column of the table before calculating block IDs for cells in a new row of the table. The tangible, non-transitory, computer-readable medium also includes code to direct the processor to calculate global edge IDs for the evolving graph based on the source vertex ID, the target vertex ID, and the block ID for the block at which each edge is located.

Example 22 incorporates the subject matter of Example 21. In this example, the tangible, non-transitory, computer-readable medium includes code to direct the processor to calculate the block IDs in a recursive function by calculating the block ID for each cell in a new column of the table based on a source vertex ID of each cell and the calculated block ID for a last diagonal cell in the table, and calculating the block ID for each cell in a new row of the table based on a target vertex ID of each cell and the calculated block ID for a cell to the right of a last diagonal cell in the table.

Example 23 incorporates the subject matter of any combination of Examples 21-22. In this example, the tangible, non-transitory, computer-readable medium includes code to direct the processor to cache block IDs for each diagonal cell and the cell to the right of each diagonal cell in the table.

Example 24 incorporates the subject matter of any combination of Examples 21-23. In this example, the tangible, non-transitory, computer-readable medium includes code to direct the processor to calculate block IDs for cells in a new column of the table before calculating block IDs for cells in a new row of the table by adding a new column as new vertices are added to the evolving graph, calculating block IDs for cells in the new column, adding a new row once block IDs have been calculated for the cells in the new column, and calculating block IDs for cells in the new row.

Example 25 incorporates the subject matter of any combination of Examples 21-24. In this example, the tangible, non-transitory, computer-readable medium includes code to direct the processor to calculate block IDs for cells in a new row of the table before calculating block IDs for cells in a new column of the table by adding a new row as new vertices are added to the evolving graph, calculating block IDs for cells in the new row, adding a new column once block IDs have been calculated for the cells in the new row, and calculating block IDs for cells in the new column.

Example 26 incorporates the subject matter of any combination of Examples 21-25. In this example, the tangible, non-transitory, computer-readable medium includes code to direct the processor to calculate a Page Rank value in a first processing window using a static algorithm, save the calculated Page Rank value as a graph state of the first processing window, and initialize a vertex value at each processing window with a Page Rank value of a previous processing window. If a new edge is added while a source vertex value for the new edge already exists in a previous processing window, the tangible, non-transitory, computer-readable medium includes code to direct the processor to fast forward all updates the source vertex received from the previous processing window to a target vertex in a first iteration of a current processing window. For all other types of edges, if a source vertex value for the edge does not exist, the tangible, non-transitory, computer-readable medium includes code to direct the processor to calculate a change in the source vertex value between a current iteration and a previous iteration and send the change in the source vertex value to a target vertex. The tangible, non-transitory, computer-readable medium also includes code to direct the processor to continue this process until vertex values have been calculated for all vertices and save the vertex values as incremental Page Rank values for the evolving graph.

Example 27 includes an apparatus, including a processor and code to direct the processor to select a block size for an evolving graph including a number of vertices and a number of edges and calculate block IDs for the evolving graph. Calculating the block IDs includes creating a table representing the evolving graph, wherein the table includes cells of the selected block size, a y-axis representing source vertex ID, and an x-axis representing target vertex ID, and as new vertices are added to the evolving graph, calculating block IDs for cells in a new column of the table before calculating block IDs for cells in a new row of the table. The apparatus also includes code to direct the processor to calculate global edge IDs for the evolving graph based on the source vertex ID, the target vertex ID, and the block ID for the block at which each edge is located.

Example 28 incorporates the subject matter of Example 27. In this example, the apparatus includes code to direct the processor to calculate block IDs for cells in a new column of the table before calculating block IDs for cells in a new row of the table by adding a new column as new vertices are added to the evolving graph, calculating block IDs for cells in the new column, adding a new row once block IDs have been calculated for the cells in the new column, and calculating block IDs for cells in the new row.

Example 29 incorporates the subject matter of any combination of Examples 27-28. In this example the apparatus includes code to direct the processor to calculate the block IDs in a recursive function by calculating the block ID for each cell in a new column of the table based on a source vertex ID of each cell and the calculated block ID for a last diagonal cell in the table, and calculating the block ID for each cell in a new row of the table based on a target vertex ID of each cell and the calculated block ID for a cell to the right of a last diagonal cell in the table.

Example 30 incorporates the subject matter of any combination of Examples 27-29. In this example, the apparatus includes code to direct the processor to calculate block IDs for cells in a new row of the table before calculating block IDs for cells in a new column of the table by adding a new row as new vertices are added to the evolving graph, calculating block IDs for cells in the new row, adding a new column once block IDs have been calculated for the cells in the new row, and calculating block IDs for cells in the new column.

Example 31 incorporates the subject matter of any combination of Examples 27-30. In this example, the apparatus includes code to direct the processor to cache block IDs for each diagonal cell and the cell to the right of each diagonal cell in the table.

Example 32 incorporates the subject matter of any combination of Examples 27-31. In this example, the apparatus includes code to direct the processor to calculate a Page Rank value in a first processing window using a static algorithm, save the calculated Page Rank value as a graph state of the first processing window, and initialize a vertex value at each processing window with a Page Rank value of a previous processing window. If a new edge is added while a source vertex value for the new edge already exists in a previous processing window, the code also directs the process to fast forward all updates the source vertex received from the previous processing window to a target vertex in a first iteration of a current processing window. For all other types of edges, if a source vertex value for the edge does not exist, the code directs the processor to calculate a change in the source vertex value between a current iteration and a previous iteration and send the change in the source vertex value to a target vertex. The code further directs the processor to continue this process until vertex values have been calculated for all vertices and save the vertex values as incremental Page Rank values for the evolving graph.

Example 33 includes a computer-readable storage including computer-readable instructions that, when executed, implement a method or realize an apparatus as described in any preceding example.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for calculating a global edge identifier (ID) for an evolving graph, comprising:
    selecting a block of a particular size for the evolving graph, the evolving graph comprising a plurality of blocks, each block comprising a plurality of vertices and a plurality of edges, wherein the plurality of vertices comprise a plurality of entities of a network and the plurality of edges comprise a plurality of relationship data between respective vertices of the plurality of vertices;
    calculating a block ID for the selected block, an edge of the plurality of edges being disposed in the selected block, wherein the edge is disposed between a source vertex and a target vertex of the plurality of vertices, the source vertex comprising a source vertex ID and the target vertex comprising a target vertex ID; and
    calculating a global edge ID for the evolving graph based on the source vertex ID, the target vertex ID, and the block ID for the block at which the edge is located;
    wherein the global edge ID is associated with the edge between the source vertex and the target vertex.

2. The method of claim 1, calculating the block ID further comprising:
    creating a table representing the evolving graph, wherein the table comprises cells of the selected block size, a y-axis representing the source vertex ID, and an x-axis representing the target vertex ID; and
    as new vertices are added to the evolving graph, calculating new block IDs for cells in a new column of the table before calculating block IDs for cells in a new row of the table.

3. The method of claim 2, further comprising calculating the new block IDs in a recursive function by calculating the block ID for each cell in a new column of the table based on the source vertex ID of each cell and the calculated block ID for a last diagonal cell in the table.

4. The method of claim 2, further comprising calculating the new block IDs in a recursive function by calculating the block ID for each cell in a new row of the table based on the target vertex ID of each cell and the calculated block ID for a cell to the right of a last diagonal cell in the table.

5. The method of claim 2, further comprising caching block IDs for each diagonal cell and a cell to the right of each diagonal cell in the table.

6. The method of claim 1, wherein the block size is $2^n$ for integer, n.

7. The method of claim 2, further comprising:
    adding a new column as new vertices are added to the evolving graph;
    calculating block IDs for cells in the new column;
    adding a new row once block IDs have been calculated for the cells in the new column; and
    calculating block IDs for cells in the new row.

8. The method of claim 1, further comprising providing the relationship data to one or more entities of the plurality of entities of the network.

9. The method of claim 1, wherein the global edge ID enables efficient storage of the relationship data of the edge, wherein the relationship data comprises strength and direction between the source vertex and the target vertex.

10. The method of claim 1, wherein the edge between the source vertex and the target vertex is disposed between two sub-graphs of the evolving graph, the two sub-graphs comprising overlapping vertices, and the global edge ID enables fast calculations on a join between the two sub-graphs.

11. The method of claim 1, wherein the relationship data comprises electronic communications between the source vertex and the target vertex.

12. The method of claim 1, further comprising calculating incremental Page Rank for the evolving graph by:
    calculating a Page Rank value in a first processing window using a static algorithm;
    saving the calculated Page Rank value as a graph state of the first processing window;
    initializing a vertex value at each processing window with a Page Rank value of a previous processing window;
    if a new edge is added while a vertex value associated with a second source vertex for the new edge already exists in a previous processing window, fast forwarding all updates the second source vertex received from the previous processing window to a second target vertex in a first iteration of a current processing window;

for all other types of edges, if the vertex value for the edge does not exist, calculating a change in the vertex value between a current iteration and a previous iteration and sending the change in the vertex value to a target vertex;

continuing this process until vertex values have been calculated for all vertices;

saving the vertex values as incremental Page Rank values for the evolving graph; and providing the incremental Page Rank values to one or more entities of the plurality of entities of the network.

13. A computing system for calculating global edge IDs for evolving graphs, comprising:

a processor; and a global edge ID assignment application to be executed by the processor, the global edge ID assignment application to:

calculate block IDs for the evolving graph, the evolving graph comprising a plurality of blocks, each block comprising a plurality of vertices and a plurality of edges, the plurality of vertices to represent a plurality of entities of a network, a first block of the plurality of blocks comprising at a first block, the first block comprising at least a source vertex, a target vertex, and an edge between the source vertex and the target vertex, the plurality of edges comprising edges disposed between vertices of the plurality of vertices, the plurality of edges to represent relationship data between respective vertices, wherein the one edge is associated with a first block ID of the calculated block IDs; and calculate global edge IDs for the evolving graph based on a source vertex ID of the source vertex, a target vertex ID of the target vertex, and the first block ID.

14. The computing system of claim 13, wherein the global edge ID assignment application further:

creates a table comprising individual cells, each cell representing a block of the evolving graph, the table comprising a y-axis representing source vertex IDs and an x-axis representing target vertex IDs; and calculates block IDs for cells in a new column of the table before calculating block IDs for cells in a new row of the table in response to new vertices being added to the evolving graph.

15. The computing system of claim 13, further comprising:

calculating the block ID for each cell in a new column of the table based on a source vertex ID of each cell and the calculated block ID for a last diagonal cell in the table; and calculating the block ID for each cell in a new row of the table based on a target vertex ID of each cell and the calculated block ID for a cell to the right of a last diagonal cell in the table.

16. The computing system of claim 13, wherein the global edge ID assignment application is to calculate block IDs for cells in a new column of the table before calculating block IDs for cells in a new row of the table by:

adding a new column as new vertices are added to the evolving graph;

calculating block IDs for cells in the new column;

adding a new row once block IDs have been calculated for the cells in the new column; and calculating block IDs for cells in the new row.

17. The computing system of claim 16, wherein the global edge ID assignment application is to cache block IDs for each diagonal cell and the cell to the right of each diagonal cell in the table.

18. The computing system of claim 13, wherein the hardware logic of the global edge ID assignment application is to calculate block IDs for cells in a new row of the table before calculating block IDs for cells in a new column of the table by:

adding a new row as new vertices are added to the evolving graph;

calculating block IDs for cells in the new row;

adding a new column once block IDs have been calculated for the cells in the new row; and calculating block IDs for cells in the new column.

19. The computing system of claim 13, wherein the computing system comprises an incremental Page Rank calculation application, at least partially comprising hardware logic, wherein the hardware logic of the incremental Page Rank calculation application is to:

calculate a Page Rank value in a first processing window using a static algorithm;

save the calculated Page Rank value as a graph state of the first processing window;

initialize a vertex value at each processing window with a Page Rank value of a previous processing window;

if a new edge is added while a source vertex value for the new edge already exists in a previous processing window, fast forward all updates the source vertex received from the previous processing window to a target vertex in a first iteration of a current processing window;

for all other types of edges, if a source vertex value for the edge does not exist, calculate a change in the source vertex value between a current iteration and a previous iteration and send the change in the source vertex value to a target vertex;

continue this process until vertex values have been calculated for all vertices;

save the vertex values as incremental Page Rank values for the evolving graph and update the incremental Page Rank values in response to one or more vertices or edges being added to the evolving graph.

20. A tangible, non-transitory, computer-readable medium comprising code to direct a processor to:

select a block size for an evolving graph comprising a plurality of vertices and a plurality of edges;

calculate block IDs for the evolving graph, wherein calculating the block IDs comprises:

creating a table representing the evolving graph, wherein the table comprises cells of the selected block size, a y-axis representing source vertex ID, and an x-axis representing target vertex ID; and as new vertices are added to the evolving graph, calculating block IDs for cells in a new column of the table before calculating block IDs for cells in a new row of the table; and calculate global edge IDs for the evolving graph based on the source vertex ID of a source vertex, the target vertex ID of a target vertex, and the block ID for the block at which an edge is located, the edge being disposed between the source vertex and the target vertex, wherein the calculated global edge IDs represent a plurality of relationship data, an instance of relationship data of the plurality of relationship data describing a relationship between at least two entities of a network.

21. The tangible, non-transitory, computer-readable medium of claim 20, wherein the tangible, non-transitory, computer-readable medium comprises code to direct the processor to execute fast calculations on a join between two sub-graphs of the evolving graph, wherein the edge between the source vertex and the target vertex is disposed between two the sub-graphs, the two sub-graphs comprising overlapping vertices.

22. The tangible, non-transitory, computer-readable medium of claim 20, wherein the tangible, non-transitory, computer-readable medium comprises code to direct the processor to cache block IDs for each diagonal cell and the cell to the right of each diagonal cell in the table.

23. The tangible, non-transitory, computer-readable medium of claim 20, wherein the tangible, non-transitory, computer-readable medium comprises code to direct the processor to efficiently store relationship data of the edge using the global edge ID, wherein the relationship data comprises strength and direction between the source vertex and the target vertex.

24. The tangible, non-transitory, computer-readable medium of claim 20, wherein the tangible, non-transitory, computer-readable medium comprises code to direct the processor to calculate block IDs for cells in a new row of the table before calculating block IDs for cells in a new column of the table by:
 adding a new row as new vertices are added to the evolving graph;
 calculating block IDs for cells in the new row;
 adding a new column once block IDs have been calculated for the cells in the new row; and
 calculating block IDs for cells in the new column.

25. The tangible, non-transitory, computer-readable medium of claim 20, wherein the tangible, non-transitory, computer-readable medium comprises code to direct the processor to:
 calculate a Page Rank value in a first processing window using a static algorithm;
 save the calculated Page Rank value as a graph state of the first processing window;
 initialize a vertex value at each processing window with a Page Rank value of a previous processing window;
 if a new edge is added while a source vertex value for the new edge already exists in a previous processing window, fast forward all updates the source vertex received from the previous processing window to a target vertex in a first iteration of a current processing window;
 for all other types of edges, if a source vertex value for the edge does not exist, calculate a change in the source vertex value between a current iteration and a previous iteration and send the change in the source vertex value to a target vertex;
 continue this process until vertex values have been calculated for all vertices; and
 save the vertex values as incremental Page Rank values for the evolving graph.

\* \* \* \* \*